(12) United States Patent
Giuseppin et al.

(10) Patent No.: US 9,526,266 B2
(45) Date of Patent: Dec. 27, 2016

(54) GLYCOALKALOID REMOVAL

(75) Inventors: Marco Luigi Federico Giuseppin, Gieten (NL); Robin Eric Jacobus Spelbrink, Groningen (NL)

(73) Assignee: COÖPERATIE AVEBE U.A., Veendam (NL)

(*) Notice: Subject to any disclaimer, the term of this patent is extended or adjusted under 35 U.S.C. 154(b) by 1349 days.

(21) Appl. No.: 12/514,322

(22) PCT Filed: Oct. 25, 2007

(86) PCT No.: PCT/NL2007/050515
§ 371 (c)(1),
(2), (4) Date: Aug. 13, 2009

(87) PCT Pub. No.: WO2008/069651
PCT Pub. Date: Jun. 12, 2008

(65) Prior Publication Data
US 2010/0105871 A1    Apr. 29, 2010

(30) Foreign Application Priority Data

Nov. 10, 2006 (EP) .................................. 06077000
Jul. 17, 2007 (EP) .................................. 07112637

(51) Int. Cl.
A23J 3/14    (2006.01)
A23J 3/16    (2006.01)
A23L 5/20    (2016.01)
A23J 1/00    (2006.01)
A23J 1/16    (2006.01)

(52) U.S. Cl.
CPC *A23J 1/006* (2013.01); *A23J 1/16* (2013.01); *A23J 3/14* (2013.01); *A23J 3/16* (2013.01); *A23L 5/273* (2016.08)

(58) Field of Classification Search
USPC ............................... 426/431; 530/370, 417
See application file for complete search history.

(56) References Cited

U.S. PATENT DOCUMENTS

2002/0025911 A1* 2/2002 Aoyagi et al. ............... 504/366

FOREIGN PATENT DOCUMENTS

WO    WO 9742834 A1 * 11/1997
WO    WO 02090311 A1 * 11/2002

OTHER PUBLICATIONS

Straetkvern et al. "Expanded bed adsorption for recovery of patatin from crude potato juice". Bioseparation, Kluwer Academic Publsihers, vol. 7, pp. 333-345, 1999.*
CDC. "Methanol", pp. 1-9, No Date. http://www.cdc.gov/niosh/ershdb/EmergencyResponseCard_29750029.html.*
Spelbrink et al., "Glycoalkaloids and Glycoalkaloid Degradation Products in Potato Protein Fractions", Jun. 14, 2012.
Laus, "TGA-Levels", 2012.
TGA solution picture.
Wolf et al., "Estimation and Physiological Role of Solanine in the Potato", Journal of Agricultural Research, vol. 73, No. 31, pp. 1-32; Washington, D.C., 1946.

(Continued)

*Primary Examiner* — D. Lawrence Tarazano
*Assistant Examiner* — Stephanie Cox (57) ABSTRACT

The invention relates to a process for the removal of glycoalkaloids, in particular from process streams such as those encountered during isolation of proteins from potatoes.

17 Claims, 3 Drawing Sheets

(56) References Cited

OTHER PUBLICATIONS

Norit CASPF, "Powdered Activated Carbon", Norit Digital Library, 2007.
Norit C. Gran, "Granular Activated Carbon", Norit Digital Library, 2006.
Norit CA1, "Powdered Activated Carbon", Norit Digital Library, 1007.

* cited by examiner

GLYCOALKALOID REMOVAL

This application is the U.S. National Phase of, and Applicants claim priority from, International Application Number PCT/NL2007/050515 filed 25 Oct. 2007, European Patent Application No. 06077000.5 filed 10 Nov. 2006 and European Patent Application No. 07112637.9 filed 17 Jul. 2007, each of which are incorporated herein by reference.

BACKGROUND OF THE INVENTION

The invention relates to a process for the removal of glycoalkaloids, in particular from process streams such as those encountered during isolation of proteins from potatoes.

The potato belongs to the Solanaceae, or nightshade, family whose other members include tomatoes, eggplants, peppers and tomatillos. The proteins that can be found in potatoes have great nutritional value. The nutritional qualities, i.e. protein efficiency ratio and biological value, of these proteins have been shown to be greater than those of casein and comparable to those of whole egg. Potato protein is rich in lysine and theoretically an excellent supplement for lysine-poor proteins such as those of cereals.

Native potato proteins can tentatively be divided into three classes (i) the patatin family, highly homologous acidic 43 kDa glycoproteins (40-50 wt. % of the potato proteins), (ii) basic 5-25 kDa protease inhibitors (30-40 wt. % of the potato proteins) and (iii) other proteins mostly high molecular weight proteins (10-20 wt. % of the potato proteins) (Pots et al., *J. Sci. Food. Agric.* 1999, 79, 1557-1564). Patatin is a family of glycoproteins that have lipid acyl hydrolase and transferase activities and can account for up to 40% of the total soluble protein fraction in potato tubers.

Potato proteins may be isolated from potato fruit juice. In the professional vocabulary, the undiluted juice from the potato tuber is called potato fruit juice (PFJ), whereas the diluted juice is designated potato fruit water. Both have a high content of organic materials which give rise to high oxygen demand in waste water from the potato starch plants. The potato fruit water also contains phosphorous- and nitrogen-compounds which fertilize the recipients. Some potato starch manufacturers employ evaporation or reverse osmosis to concentrate potato fruit water for use as a feed supplement. Reverse osmosis, which is not as energy demanding as evaporation, does however demand that the potato fruit water is pre-treated and filtered to clarity to avoid clogging of the membranes which hold inorganic salts and low molecular weight organic components back in the concentrate.

Fresh potato juice is a complex mixture of soluble and insoluble material comprising proteins, starch, minerals, toxic glycoalkaloids, fibres and monomeric and polymeric reactive phenols. Due to oxidation of natural phenolic compounds potato juice may turn brown or black. Chemically, the phenolic compounds are oxidized into quinones, which rapidly combine into a dark polymer residue. During the oxidation process, the proteins may undergo rapid reaction and partial crosslinking. This crosslinking dramatically reduces the solubility of the proteins, potentially resulting in sedimentation. Thus, from a technological point of view, the complexity and instability of the potato juice makes the separation and isolation of minimally denatured or modified potato proteins much more complicated and economically demanding than the isolation of proteins from other types of protein solution, such as ewe or cow milk.

Another complication of purification of potato proteins is formed by the presence of glycoalkaloids, which must be removed before the potato proteins may be used in human nutrition and human applications. Glycoalkaloids are well-known anti-nutritional factors. The glycosylated forms of glycoalkaloids, such as α-solanine and α-chaconine, show the highest toxicity. The aglycons, such as solanidine, have a more than 100-fold lower liver toxicity. α-Solanine and α-chaconine make up more than 95% of the total glycoalkaloid content in potatoes. Other glycoalkaloids are for example tomatine, tomatidenol and demissidine. In the context of the present disclosure, the level of glycoalkaloids is expressed as the sum of all glycoalkaloids. In case of potatoes this predominantly consists of α-solanine and α-chaconine.

Glycoalkaloids have a bitter taste and negatively affect many of the physical and/or biological properties of potato proteins, especially when the pH is increased by adhering to the soluble proteins as shown in the present disclosure. For food applications, the taste threshold of glycoalkaloids is about 140-170 mg of glycoalkaloids expressed as α-solanine per kg of product. This threshold strongly limits the applications of known native potato protein isolates in foods.

Various attempts have been made to remove glycoalkaloids. WO-97/42834, for instance, discloses a partial removal of glycoalkaloids by various ultrafiltration methods at excessive diafiltration conditions. Ultrafiltration can remove some glycoalkaloids and salts, but does not remove contaminants of high molecular weight, such as polyphenols and proanthocyanidines and colored derivatives thereof, such as epicatechins and anthocyanines, that are formed at pH values below 4.5. Houben et al., *J. Chromatogr. A,* 1994, 661, 169-174 have employed a HPLC method which, however, does not detect the aglycons that are formed by enzymatic hydrolysis after prolonged processing of potato juice.

In DE 100 60 512 it has been proposed to remove glycoalkaloids from potato proteins by acidic extraction. This method, however, is not suitable for achieving glycoalkaloid levels below 100 ppm. Furthermore, this method can only be employed for precipitated or coagulated protein, and not for native, soluble protein.

Another method for removal of glycoalkaloids that has been suggested is enzymatic hydrolysis. This method, however, does not lead to removal of aglycon, which also binds to the potato proteins with negative effects on their physical and biological properties.

Fermentation is deemed unsuitable for safe removal of glycoalkaloids in the production of native potato proteins. Conversion by fermentation causes severe technical problems when implemented at commercial scale. The bioconversions are costly and have a low productivity. The microorganisms that are used and their metabolites may end up in the protein product, which is undesirable.

One of the major problems in the isolation of potato proteins is caused by the common method of recovering the potato protein from the effluent of potato starch mills, which involves heat coagulation. Attempts to isolate the proteins from the potato juice using milder methods, such as membrane filtration and precipitation by heat of acid treatment, have proven to be inefficient on industrial scale. Membrane filtration applied directly to unclarified and clarified potato juice has proven to be very complicated and inefficient due to heavy fouling of the membranes and concomitant loss of flux and separation ability. Both membrane filtration and precipitation methods have significant drawbacks when applied directly to the potato juice due to the lack of selectivity between the desired protein product and other components in the raw material. Membrane filtration, for example, cannot separate the high molecular weight protein product from polymerized phenolic compounds or polysaccharides since the membrane will tend to retain them all.

In the European patent application no. 06077000.5, an improved method for isolating native proteins from potatoes has been disclosed. This method comprises subjecting potato fruit juice to a flocculation by a divalent metal cation at a pH of 7-9, centrifuging the flocculated potato fruit juice, thereby forming a supernatant, subjecting the supernatant to expanded bed adsorption chromatography operated at a pH of less than 11 and a temperature of 5-35° C. using an adsorbent capable of binding potato protein, thereby adsorbing the native potato protein to the adsorbent, and eluting at least one native potato protein isolate from the adsorbent with an eluent. This method constitutes a significant improvement over earlier attempts to isolate potato proteins in that the potato proteins are obtained in native, i.e. non-denatured, form and in that a very high purity may be reached.

Nevertheless, it has been found that the method may not always reach sufficient removal of glycoalkaloids, particularly when variations in raw materials are encountered. Depending on the potato variety, the level of glycoalkaloids in the fruit juice may vary considerably. Variations of a factor 4-7, or more, are common in starch potato processing. For instance, a cultivar Seresta of Kuras contains more than 110-200 ppm some cultivars up to 300 ppm glycoalkaloids in fresh weight potato, whereas an Aveka cultivar contains only 30 ppm in fresh weight potato. The glycoalkaloids tend to adhere to or co-fractionate with the proteins. Potatoes that contain 1-1.5% soluble protein will lead to protein solutions than contain more than 300 to 4000 ppm glycoalkaloids on protein basis. Also, glycoalkaloid levels may vary per variety depending on the harvesting season and weather conditions. It has been found that the method disclosed in the European patent application no. 06077000.5 may be difficult to adjust to cope with the variations in glycoalkaloid level, particularly when these variations are higher than 200 ppm. As a result, it may happen that the potato protein isolates obtained contain unsatisfactory amounts of glycoalkaloids.

There is thus still a need for a simple and effective method to remove glycoalkaloid from process streams encountered during isolation of potato proteins in native, soluble form on an industrial scale.

SUMMARY OF THE INVENTION

In accordance with the invention, it has surprisingly been found that glycoalkaloids and/or alkaloids may be removed from an aqueous solution of a vegetable protein, such as potato protein or yam protein, by adsorption using an activated carbon as adsorbent. Without wishing to be bound by theory, it is postulated that the activated carbon not only adsorbs glycoalkaloids, but can also play a role in breaking up or competing with proteins and partly to total deglycosylated glycoalkaloids, thereby achieving a more effective and complete removal of glycoalkaloids from the solution.

The invention accordingly relates to a process for removing glycoalkaloids from an aqueous solution of a vegetable protein comprising contacting the solution to an activated carbon for a period effective to adsorb the glycoalkaloids, and separating the activated carbon from the solution to obtain a substantially glycoalkaloid-free aqueous solution of vegetable protein.

A process according to the invention is highly economical and effective even in a large scale production of the vegetable protein. Using a process according to the invention, it has been found possible to achieve glycoalkaloid levels as low as <10 ppm (based on dry matter), thereby yielding a vegetable protein suitable for any food or pharmaceutical application. The glycoalkaloid level herein refers to the total of glycosylated and deglycosylated glycoalkaloids. It has further been found that a process according to the invention essentially does not suffer from undesired loss of protein). Other advantages of the invention will become clear from the present disclosure.

It will be understood that the aqueous solution of a vegetable protein subjected to glycoalkaloid removal according to the invention will be a solution comprising undesired amounts of glycoalkaloids. Typical amounts of glycoalkaloids in the solution lie between 1 and 300 ppm, preferably between 3 and 50 ppm. The typical amount of glycoalkaloids in PFJ is in the range of 50-200 ppm on liquid basis, while the typical amount of glycoalkaloids in protein isolates lies within the range of 1-40 ppm on liquid basis.

DETAILED DESCRIPTION OF THE INVENTION

In a preferred embodiment, a process according to the invention is part of a process for isolating or recovering a vegetable protein from its vegetable source. In the context of the invention, the vegetable protein may be from any vegetable source containing glycoalkaloids or alkaloids. Preferred examples include potato, yam, sweet potato, taro, oca and cassava.

High protein concentrations are preferred in accordance with the invention to obtain a high effectivity per adsorbent volume and a low final glycoalkaloid level per amount of protein. Typical concentrations of the vegetable protein in the aqueous solution from which glycoalkaloids are to be removed according to the invention are from 0.5 to 25% (w/v), preferably from 5 to 20% (w/v). It is to be noted that the invention is specifically directed to removal of glycoalkaloids from a solution of a vegetable protein. This means that the protein is in its soluble form, preferably in its native, non-denatured form.

Other substances besides the vegetable protein and the glycoalkaloids may also be present in an aqueous solution to be subjected to a process according to the invention, as long as they do not, or at least not substantially, affect the native, non-denatured state of the vegetable protein. They will not, or not to any significant degree, affect the effectiveness of a process according to the invention for removing glycoalkaloids. If the removal of glycoalkaloids is part of the isolation of a vegetable protein, the nature and amount of these substances will depend on the stage in the isolation of the vegetable protein at which the removal is carried out. Typical examples of possibly present substances are fatty materials, fibres and pectins. The presence of organic solvents in which glycoalkaloids are readily soluble, such as methanol and ethanol, is not preferred. Residual colour precursors and precursors of flavours and flavours can also be removed with activated coal.

The activated carbon that is used in a process according to the invention may be in particulate or granular form. Preferably at least 98 wt. % of the activated carbon particles have a particle size of between 0.8 and 2.0 mm more preferably between 1.0 and 2.0, as measured using a sieve analysis on a Retsch AS200. It is further preferred that these carbons are used in activated form, which means that they have been treated with steam or acid, such as phosphoric acid, before use. Preferred commercially available types of activated carbon that can be used include Norit® GAC 1240 Plus, Norit® C-Gran, Norit® CASPF, Norit® SX 1G, Norit® CGSP, Chemviron® Carbon pellets, Fluka® 05105 Active Charcoal. Advantageously, it has been found that the binding capacity of the used activated carbon is in the range of 50-100 grams of glycoalkaloid per liter of activated carbon at residence times of 15-30 minutes.

In one embodiment of the invention, the activated carbon is simply added to the aqueous solution of the vegetable protein and, after a period effective for the activated carbon to adsorb the glycoalkaloids, removed. Advantageous in this embodiment, is that the activated carbon with the glycoalkaloids adsorbed thereto will precipitate, thereby facilitating an easy removal by filtration. For this embodiment active coal can be used, wherein at least 85% of the particles have a particle size of 5-90 µm. The active coal can be applied at room temperature under mechanical agitation in a shaker.

In another embodiment of the invention, the activated carbon is used as a column material over which the aqueous solution of the vegetable protein is passed as an eluent. During elution, the glycoalkaloids will adsorb to the activated carbon and at the bottom of the column, the collected eluate is an aqueous solution of the vegetable protein from which glycoalkaloids are essentially completely removed. The method is very effective to remove glycoalkaloids from solutions containing patatin. Solutions containing protease inhibitors will require longer residence times to obtain similar low residual levels. The height of the column in which the activated carbon is packed in accordance with this embodiment is preferably between 60 and 200 cm, more preferably between 60 and 100 cm with a height to width ratio of 4:1 to 6:1 with a minimal diameter of 4 cm. Use of the activated carbon in the form of a column over which the aqueous solution of the vegetable protein is eluted allows for a very efficient and economical process, which can even be performed in a continuous manner. It will be understood, however, that after some time the column material will become saturated with glycoalkaloids and will have to be replaced with fresh material. It is preferred that the saturation level of the activated carbon with glycoalkaloids is monitored during performance of a process according to the invention.

The optimum pH for carrying out a process according to the invention depends on the pH of the aqueous solution of the vegetable protein in relation to the physical properties, and in particular the solubility, of the protein and protein fractions involved. In the case of protease inhibitor isolates, a low pH such as in the range of 3.0-4.5 can be used, whereas total protein isolates or patatin isolates place more constraints on the pH range that can be used. A pH of at least 4.0, such as at least 5.0, or at least 6.5, preferably between 7.0 and 8.5, is preferred for removing essentially all glycoalkaloids without significant loss of protein due to precipitation or adsorption to the activated carbon.

As mentioned above, it is preferred that a process according to the invention is carried out as part of a process for isolating a protein or protein fraction from a vegetable source. Although it is in accordance with this embodiment possible to carry out a process according to the invention on the vegetable fruit juice, preferably potato fruit juice, as the aqueous solution of the vegetable protein, it is preferred that the activated carbon is used at a later stage in a process for isolating a protein or protein fraction from a vegetable source.

In a highly preferred embodiment, a process according to the invention is carried out as part of a process for isolating a protein or protein fraction as disclosed in the European patent application no. 06077000.5. This process comprises the steps of subjecting potato fruit juice to a flocculation by a divalent metal cation at a pH of 7-9;

centrifuging the flocculated potato fruit juice, thereby forming a supernatant;

subjecting the supernatant to expanded bed adsorption chromatography operated at a pH of less than 11, and a temperature of 5-35° C. using an adsorbent capable of binding potato protein, thereby adsorbing the native potato protein to the adsorbent; and eluting at least one native potato protein isolate from the adsorbent with an eluent, and leads to a highly pure native potato protein isolate with a minimum of denatured protein and stable solubility. It is preferred that the activated carbon is used to remove glycoalkaloids after the step of expanded bed adsorption chromatography.

According to this embodiment, the potato fruit juice is pre-treated with a divalent metal cation at a pH of 7-9, preferably 7.0-7.5, to flocculate undesired material, followed by a separation of the flocks by centrifugation. A particularly suitable divalent metal cation is $Ca^{2+}$. It has been found that this pre-treatment removes undesired material such as negatively charged polymers, pectins, and to some extent glycoalkaloids, and micro-organisms from the potato fruit juice. In particular, the removal of pectins and glycoalkaloids is advantageous, since these compounds adhere to the potato proteins and may cause flocculation. These compounds thus lead to an unstable protein isolate.

In the second step of the process, the supernatant is subjected to expanded bed adsorption chromatography. This technique is described in WO-A-2004/082397, which document is hereby incorporated by reference. In contrast to the method described in WO-A-2004/082397, according to process of the invention it is advantageous to keep the temperature of the starting material below 35° C. for a better stability of patatin. Furthermore, in the process of the invention it is preferred to use a moderately high flow rate, typically in the range of 600-1 200 cm/h.

The expanded bed adsorption chromatography is operated at a pH of less than 11, preferably at a pH of less than 10.

The native potato proteins in the pre-treated potato fruit juice are isolated from the supernatant by binding them onto a suitable adsorbent in the expanded bed adsorption column.

Column materials that bind native potato proteins include mixed-mode adsorbentia such as Amersham Streamline™ Direct CST I (GE Healthcare), Fastline adsorbentia (Upfront Chromatography A/S), macroporous adsorbentia such as Amberlite™ XAD7HP (Röhm & Haas Company) and ion exchange adsorbents (for patatin isolates and purification see G. Koningsveld, "*Physico-chemical and functional properties of potato proteins*", PhD thesis, Wageningen University, Wageningen, The Netherlands, 2001; for protease inhibitor isolates see L. Pouvreau, "*Occurrence and physico-chemical properties of protease inhibitors from potato tuber* (*Solanum tuberosum*)", PhD thesis, Wageningen University, Wageningen, The Netherlands, 2004). The adsorbent with adsorbed native potato proteins is subsequently eluted with a suitable eluent in order to retrieve the native potato protein isolate. The eluent preferably has a pH in the range of 4-12, more preferably in the range of 5.5-9.0.

Preferably, the native potato protein isolate has an isoelectric point above 4.8, a molecular weight of more than 5 kDa and a glycoalkaloid concentration of less than 150 ppm on protein basis.

In a preferred embodiment using mixed-mode adsorbentia the proteins can be fractionated to both isoelectric point and molecular weight. This allows separating the patatin and protease inhibitor fractions. Patatin isolates are eluted at a pH of 5.7-8.7, preferably at a pH of 5.8-6.2. Protease inhibitors are eluted at a pH of 5.8-12.0, preferably at a pH of 6.0-9.5.

The mixed-mode adsorbentia can be used in two modes. The first mode is selective elution, which comes down to binding of essentially all of the potato protein and subsequently eluting a first desired potato protein fraction with an appropriate buffer and eluting a second desired potato protein fraction with another appropriate buffer. The second mode is selective adsorption, which comes down to binding of a first desired potato protein fraction on one column at an elevated pH, and adjusting the effluent to a lower pH so that a second desired potato protein fraction can bind on a second column.

Selective elution is described in the examples. Selective adsorption for instance involves passing a potato fruit juice at pH 5.0-7.0, typically at pH 6.0, over a first column to bind the protease inhibitor fraction. The protease inhibitor fraction may be eluted using an appropriate buffer as described above. The effluent of the first column is adjusted to a pH of 4.5-5.0, preferably to a pH of 4.8, and passed over a second column to bind the patatin fraction. Patatin is eluted using an appropriate buffer as described above. Selective adsorption yields a robust processing and higher purity of the isolates than selective elution.

After elution, the native potato proteins may advantageously be concentrated by ultrafiltration. The choice of the ultrafiltration membrane material can strongly influence the selectivity. Preferably, the ultrafiltration membrane is negatively charged and comprises regenerated cellulose, polyethersulphones and polysulphones (PES). Protease inhibitors isolates may be concentrated using PES based membranes with a molecular cut-off of 2-20 kDa, and to some extent 30 kDa. Patatin isolates may be concentrated using PES based membranes with a molecular cut-off of 5-30 kDa or a regenerated cellulose based membrane with a molecular cut-off of 5-30 kDa. These membranes can be implemented as tubular, spiral wound, hollow fibre, plate and frame, or as cross-rotational induced shear filter units.

Ultrafiltration membranes should be operated at conditions that lead to concentration effectively. Patatin isolates are ultrafiltrated at pH values of 4.0-6.0, preferably pH 4.5-5.4. For protease inhibitor isolates pH values of 3-7, preferably 3.2-4.5 are used. After removal of glycoalkaloids the pH can be increased to pH 7-10 to enable high fluxes through the membranes. Protease inhibitors are preferably processed at low pH of 3.0-5.0.

The native potato protein isolate thus obtained is essentially free from toxic components, off-flavour and colour. The isolate is further organoleptically neutral and stable. Additional purification steps in the process of the invention can be the following. An ion-exchange step may be applied to isolate protease inhibitors or patatin with an alkaline or acid elution.

The removal of glycoalkaloids in accordance with the invention is preferably included in a process as disclosed in the European patent application no. 06077000.5 after the expanded bed adsorption chromatography and before ultrafiltration, if included. This means that it is preferred that after the elution of the expanded bed, a second elution over a column of an activated carbon, essentially as described above is performed.

The invention also encompasses a native potato protein isolate obtainable by a process according to this embodiment, and having a glycoalkaloid content below 100, preferably below 15 ppm.

The invention will now be further elucidated by the following, non-restrictive examples.

EXAMPLES

Protein Determination

The protein concentration was estimated by measuring the adsorption at 280 nm of an adequate dilution of a sample in an 0.1 M NaOH solution. This absorption at 280 nm corresponds with protein as determined by nitrogen level×6.25 by the equations. The baseline is adjusted to zero with 100 mM NaOH. For patatin the equation is patatin=(OD 280 nm×dilution factor+0.0007)/1.10 [mg/g]); for protease inhibitor isolates the equation is protease inhibitor=(OD 280 nm×dilution factor+0.0301)/1.02 [mg/g].

Total Glycoalkaloid Determination

Glycoalkaloids were determined using both a HPLC method (Houben et al., *J. Chromatogr. A* 1994, 661, 169-174) and a colorimetric method (Walls et al., *J. Chem. Ecol.* 2005, 31, 2263-2288). The first analysis determines the main glycoalkaloids, the second analysis is a quick assay that determines both total glycoalkaloids and the aglycons after acid hydrolysis.

In the colorimetric analysis all the glycoalkaloids are de-glycosylated by acid treatments into their aglycons, solanidine. The resulting material is extracted with chloroform and the reaction product with methyl orange is measured at 420 nm.

The levels of both α-solanine and α-chaconin was determined using the HPLC method. The detection level was >0.15-0.3 ppm.

Particle Size Distributions

Particle size distributions were determined on a Retsch AS200 control "g" operating at 200 mm amplitude with interval times of 10 seconds over a period of 5 minutes using appropriate sized sieves. The results are shown in Table 1.

TABLE 1

Particle size distributions in % for granular active carbons and bentonite

| Fraction (micrometer) | C-GRAN | GAC 1240+ |
|---|---|---|
| >2 000 | 0 | 51.6 |
| 2 000-1 000 | 97.8 | 76.1 |
| 800-1 000 | 0.4 | 14.8 |
| 500-800 | 0.6 | 7.3 |
| <500 | 0.2 | 0.2 |

Example 1

Procedure: protease inhibitors eluate, as obtained in Example 1 method 10 of the European patent application no. 06077000.5, was exposed to 5 different varieties of active carbons at 4 different pHs. Activated carbons tested: Chemviron® Carbon pellets, Fluka® 05105 Active Charcoal, Norit® CASPF, SX1G, CGSP.

0.10 g Active Carbon of each type was weighed and placed in a 15 ml plastic tube. 70 ml protease inhibitors eluates were adjusted to pHs of 2.97, 4.57, 6.51 or 8.04 with 100% HAc, 1 M or 4 M NaOH respectively. 10 ml of each pH-adjusted protease inhibitors eluate were added to each tube, which were incubated at ambient temperature for 120 minutes. Per pH tested, two tubes were not exposed to active carbon. One of these tubes was kept as a blank, while the other was subjected to filtration under identical conditions as the carbon-containing samples.

Active carbon was separated from the eluate by filtration of Schleicher & Schuell 595 70 mm filters in a Buchner-funnel on a suction flask/filtering bottle under gentle suction by a water aspirator.

Figure 1:
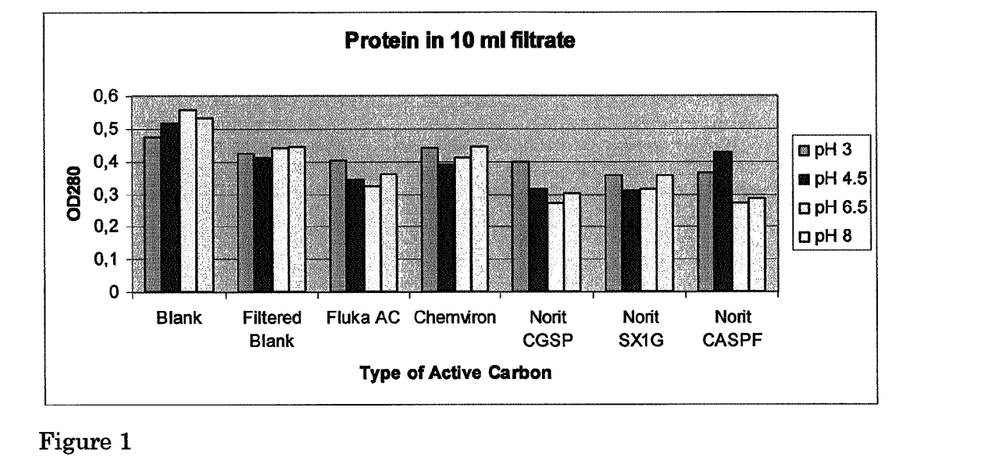

7 ml of the filtrate were stored for TGA and protein analysis. 250 microliter filtrate was diluted in 4750 microliter 0.1 M NaOH. The OD 280 nm was determined in a quarts cuvette relative to a 0.1 M NaOH blank on a Bio-Rad SmartSpecPlus UV spectrophotometer. The results and the corresponding bar diagram are shown in Table 2 and FIG. 1.

TABLE 2

Protein levels OD 280 nm after 1:20 dilution in 100 mM NaOH against a 100 mM NaOH blank

|  | Control | Filtered Control | Fluka® AC | Chemviron® | Norit® CGSP | Norit® SX1G | Norit® CASPF |
|---|---|---|---|---|---|---|---|
| pH 3 | 0.476 | 0.423 | 0.404 | 0.441 | 0.397 | 0.356 | 0.367 |
| pH 4.5 | 0.518 | 0.411 | 0.344 | 0.392 | 0.313 | 0.310 | 0.428 |
| pH 6.5 | 0.557 | 0.441 | 0.325 | 0.413 | 0.272 | 0.313 | 0.271 |
| pH 8 | 0.534 | 0.444 | 0.362 | 0.444 | 0.303 | 0.355 | 0.285 |

Figure 2:
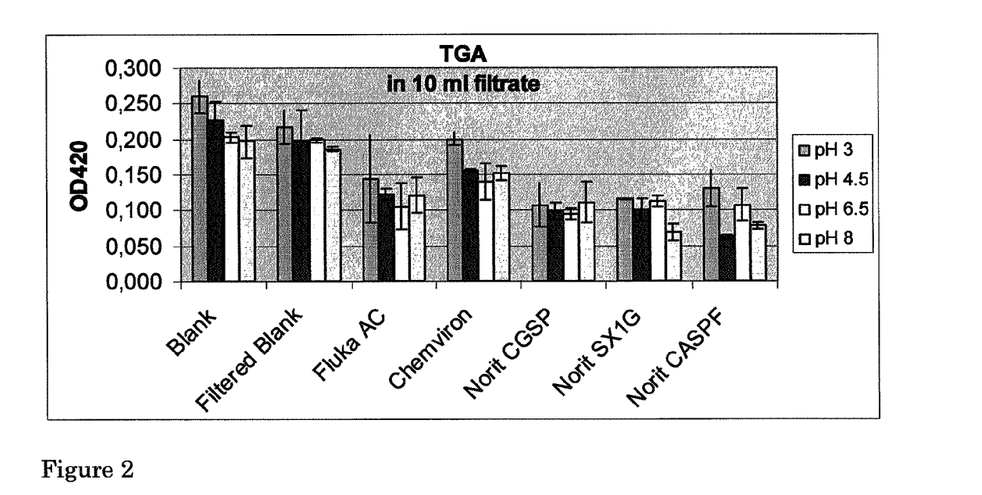
Figure 3:
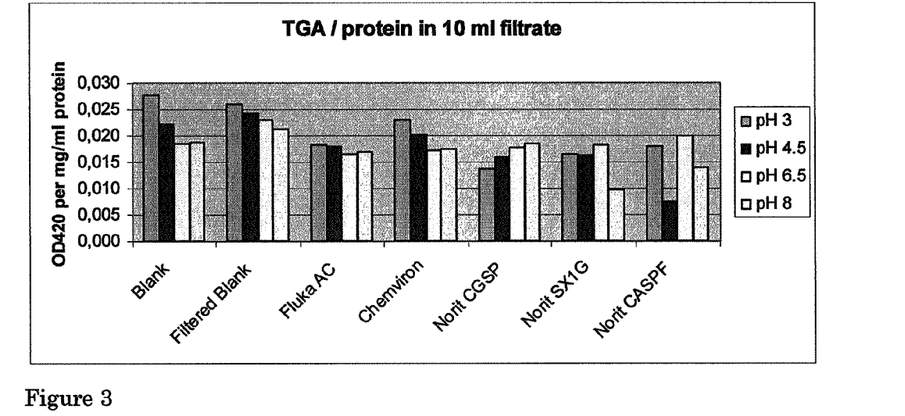

TGA levels were determined via the appropriate protocols by colorimetric analysis at 420 nm against a chloroform blank. The results are summarized in Table 2 and FIGS. 2 and 3.

TABLE 3

Residual TGA expressed as OD 420 nm

|  | Control | Filtered Control | Fluka® AC | Chemviron® | Norit® CGSP | Norit® SX1G | Norit® CASPF |
|---|---|---|---|---|---|---|---|
| pH 3 | 0.260 | 0.217 | 0.145 | 0.200 | 0.108 | 0.116 | 0.130 |
| pH 4.5 | 0.227 | 0.197 | 0.122 | 0.156 | 0.099 | 0.100 | 0.063 |
| pH 6.5 | 0.203 | 0.199 | 0.106 | 0.140 | 0.096 | 0.112 | 0.108 |
| pH 8 | 0.197 | 0.187 | 0.121 | 0.152 | 0.111 | 0.069 | 0.079 |

Norit® CAS PF at pH 4.5 and Norit® SX 1 G at pH 8 were found to be most capable of removing TGA from protease inhibitors eluate without significant removal of protein.

Example 2

Procedure: patatin eluate, as obtained in Example 1 method 9 of the European patent application no. 06077000.5 was exposed to 3 different varieties of active carbons at 5 different pH values.

Materials: Norit® CASPF, SX1G, CGSP.

Figure 4:
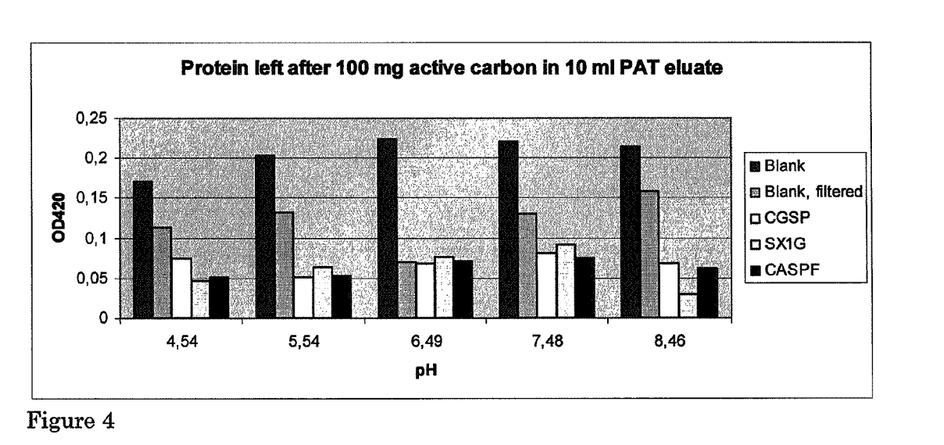
Figure 5:
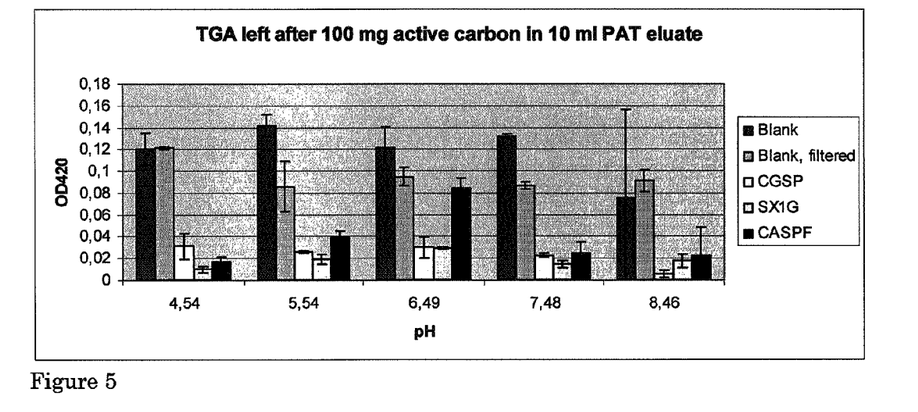
Figure 6:
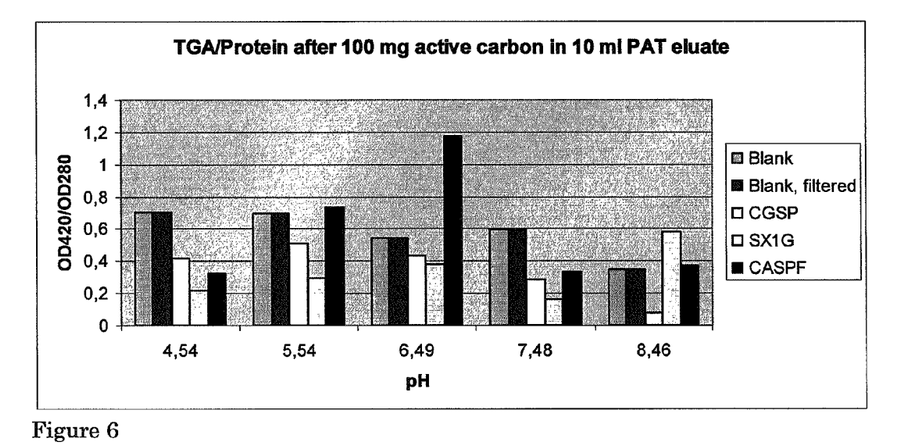

0.10 g Activated Carbon of each type was weighed and placed in a 7 ml falcon tube. 70 ml patatin eluates were adjusted to pHs of 4.54, 5.45, 6.49, 7.48 or 8.46 with 100% HAc, 1 M or 4 M NaOH. 10 ml of every fraction were added to the tubes and incubated under rotation at ambient temperature for 120 minutes. For every pH two tubes were kept as controls without carbon. One of these was subjected to filtration while the other was not. Activated carbon was separated from the eluate by Büchner-filtration over a 70 mm Schleicher & Schuell 595 filter using a water aspirator. The filtrates were stored for protein and TGA determination via appropriate protocols. The results are shown in Table 4 and FIGS. 4, 5 and 6.

form C-GRAN is the corresponding granular carbon. The columns with a length of 100 cm and a diameter of 6 cm were loaded with 1.7 liters of degassed GAC1240+(Norit, The Netherlands) per column for a total bed depth of 60 cm per column. This is the minimal depth required to prevent channeling in the carbon bed.

Patatin eluate, as obtained in Example 1 method 9 of the European patent application no. 06077000.5, and a concentrate of same eluate of 1.1 brix and 3.9 brix respectively were run over the carbon beds of two columns each with a residence time of 30 minutes, corresponding to approximately 14 ml per hour. After each column fractions were collected and analysed for brix, pH, conductivity, OD 280 nm and TGA content via the colorimetric and HPLC method. The results are shown in the Tables 5 and 6.

The invention claimed is:

1. A process for removing glycoalkaloids from an aqueous solution of a native non-denatured vegetable protein, the process comprising contacting the solution with an activated carbon for a period effective to adsorb the glycoalkaloids, and separating the activated carbon from the solution to obtain a substantially glycoalkaloid-free aqueous solution of native non-denatured vegetable protein.

TABLE 4

| Sample number | Type of carbon | pH | TGA OD 420 nm | TGA OD 420 nm duplicate | Protein 1:20 OD 280 nm | TGA Average OD 420 nm | TGA Stdev | Ratio OD 420 nm/ OD 280 nm |
|---|---|---|---|---|---|---|---|---|
| 1 | Control | 4.54 | 0.11 | 0.131 | 0.171 | 0.120 | 0.0148 | 0.704 |
| 2 | Control | 5.54 | 0.149 | 0.135 | 0.204 | 0.142 | 0.0098 | 0.696 |
| 3 | Control | 6.49 | 0.107 | 0.135 | 0.223 | 0.121 | 0.0197 | 0.542 |
| 4 | Control | 7.48 | 0.131 | 0.133 | 0.221 | 0.132 | 0.0014 | 0.597 |
| 5 | Control | 8.46 | 0.018 | 0.133 | 0.215 | 0.075 | 0.0813 | 0.351 |
| 6 | Control filtrated | 4.54 | 0.122 | 0.121 | 0.114 | 0.121 | 0.0007 | 1.065 |
| 7 | Control filtrated | 5.54 | 0.102 | 0.070 | 0.132 | 0.086 | 0.0226 | 0.651 |
| 8 | Control filtrated | 6.49 | 0.101 | 0.089 | 0.070 | 0.095 | 0.0084 | 1.357 |
| 9 | Control filtrated | 7.48 | 0.089 | 0.084 | 0.131 | 0.086 | 0.0035 | 0.660 |
| 10 | Control filtrated | 8.46 | 0.098 | 0.084 | 0.159 | 0.091 | 0.0098 | 0.572 |
| 11 | CGSP | 4.54 | 0.039 | 0.023 | 0.074 | 0.031 | 0.0113 | 0.418 |
| 12 | CGSP | 5.54 | 0.027 | 0.025 | 0.051 | 0.026 | 0.0014 | 0.509 |
| 13 | CGSP | 6.49 | 0.037 | 0.023 | 0.069 | 0.030 | 0.0098 | 0.434 |
| 14 | CGSP | 7.48 | 0.022 | 0.024 | 0.080 | 0.023 | 0.0014 | 0.287 |
| 15 | CGSP | 8.46 | 0.008 | 0.003 | 0.069 | 0.005 | 0.0035 | 0.071 |
| 16 | SX1G | 4.54 | 0.008 | 0.012 | 0.046 | 0.010 | 0.0028 | 0.217 |
| 17 | SX1G | 5.54 | 0.022 | 0.016 | 0.064 | 0.019 | 0.0042 | 0.296 |
| 18 | SX1G | 6.49 | 0.028 | 0.030 | 0.076 | 0.029 | 0.0014 | 0.381 |
| 19 | SX1G | 7.48 | 0.017 | 0.012 | 0.091 | 0.015 | 0.0035 | 0.159 |
| 20 | SX1G | 8.46 | 0.013 | 0.022 | 0.030 | 0.017 | 0.0063 | 0.583 |
| 21 | CASPF | 4.54 | 0.013 | 0.020 | 0.051 | 0.016 | 0.0049 | 0.322 |
| 22 | CASPF | 5.54 | 0.035 | 0.043 | 0.053 | 0.039 | 0.0056 | 0.735 |
| 23 | CASPF | 6.49 | 0.091 | 0.078 | 0.072 | 0.0845 | 0.0092 | 1.173 |
| 24 | CASPF | 7.48 | 0.032 | 0.017 | 0.074 | 0.0245 | 0.0106 | 0.331 |
| 25 | CASPF | 8.46 | 0.041 | 0.005 | 0.062 | 0.023 | 0.0255 | 0.370 |

While all Norit® carbons are efficient at removing TGA from patatin eluate, most protein remains in solution after exposure to Norit® SX 1 G at pH 7.5. Based on these results best performance is obtained using Norit® SX 1 G and its derived granulated form GAC 1240+.

Example 3

Adsorption materials used: for the SX 1 G carbon the corresponding granular form is GAC 1240+, for the CASPF 2. A process according to claim 1, wherein the vegetable protein is a potato protein, a yam protein, a sweet potato protein, a taro protein, or an oca protein.

3. A process according to claim 1, wherein the aqueous solution, before contacting the activated carbon, comprises between 1 and 50 ppm of glycoalkaloids.

4. A process according to claim 1 carried out as part of a process for isolating or recovering a protein or protein fraction from a vegetable source.

5. A process according to claim 1, wherein the activated carbon is used in particulate or granular form.

6. A process according to claim 5, wherein at least 85% of the activated carbon has a particle size of between 0.4 and 2.0 mm.

7. A process according to claim 1, wherein the aqueous solution of the vegetable protein is contacted with the activated carbon at a pH in the range of 3.0-4.5.

8. A process according to claim 1, wherein the aqueous solution of the vegetable protein is contacted with the activated carbon at a pH of at least 4.0.

9. A process according to claim 1, wherein the activated carbon is added to the aqueous solution of the vegetable protein and, after a period effective for the activated carbon to adsorb the glycoalkaloids, removed.

10. A process according to claim 9, wherein the activated carbon is removed by filtration.

11. A process according to claim 1, wherein the activated carbon is used as a column material over which the aqueous solution of the vegetable protein is passed as an eluent.

12. A process for obtaining a native, non-denatured, potato protein isolate comprising patatin and protease inhibitor, comprising subjecting potato fruit juice to a flocculation by a divalent metal cation at a pH of 7-9;

centrifuging the flocculated potato fruit juice, thereby forming a supernatant;

subjecting the supernatant to expanded bed adsorption chromatography operated at a pH of less than 11 and a temperature of 5-35° C. using an adsorbent capable of binding potato protein, thereby adsorbing the native potato protein to the adsorbent;

eluting at least one native potato protein isolate from the adsorbent with an eluent; and passing the eluate over a column packed with an activated carbon to remove glycoalkaloids.

13. A process according to claim 12, wherein the activated carbon is used in particulate or granular form.

14. A process according to claim 13, wherein at least 85% of the activated carbon has a particle size of between 0.4 and 2.0 mm.

15. A process according to claim 1, wherein the aqueous solution of the vegetable protein is contacted with the activated carbon at a pH of at least 5.0.

16. A process according to claim 1, wherein the aqueous solution of the vegetable protein is contacted with the activated carbon at a pH of at least 6.5.

17. A process according to claim 1, wherein the aqueous solution of the vegetable protein is contacted with the activated carbon at a pH of between 7.0 and 8.5.

* * * * *